(12) United States Patent
Heide et al.

(10) Patent No.: US 12,209,798 B2
(45) Date of Patent: Jan. 28, 2025

(54) SECURE REMOTE ACCESS TO A REEFER CONTROL SYSTEM

(71) Applicant: MAERSK CONTAINER INDUSTRY A/S, Tinglev (DK)

(72) Inventors: Morten Heide, Kolding (DK); Jakob Brøchner Vilhelmsen, Tinglev (DK)

(73) Assignee: MAERSK CONTAINER INDUSTRY A/S, Tinglev (DK)

( * ) Notice: Subject to any disclaimer, the term of this patent is extended or adjusted under 35 U.S.C. 154(b) by 863 days.

(21) Appl. No.: 17/260,819

(22) PCT Filed: Jul. 9, 2019

(86) PCT No.: PCT/EP2019/068414
§ 371 (c)(1),
(2) Date: Jan. 15, 2021

(87) PCT Pub. No.: WO2020/016059
PCT Pub. Date: Jan. 23, 2020

(65) Prior Publication Data
US 2021/0262727 A1    Aug. 26, 2021

(30) Foreign Application Priority Data
Jul. 19, 2018 (DK) .............................. PA201870492

(51) Int. Cl.
*F25D 29/00* (2006.01)
*F25D 11/00* (2006.01)
(Continued)

(52) U.S. Cl.
CPC .......... *F25D 29/003* (2013.01); *F25D 11/003* (2013.01); *G06Q 10/087* (2013.01);
(Continued)

(58) Field of Classification Search
CPC ... F25D 29/003; F25D 11/003; G06Q 10/087; H04L 63/08; H04L 63/101; H04L 67/12; H04W 12/06; H04W 12/08
See application file for complete search history.

(56) References Cited

U.S. PATENT DOCUMENTS 5,579,648 A * 12/1996 Hanson ................ B60H 1/3225
                                                            62/131
6,510,350 B1    1/2003 Steen, III et al.
(Continued)

FOREIGN PATENT DOCUMENTS

CA       2366464 A1 * 10/2000
CN       1354847 A      6/2002
(Continued)

OTHER PUBLICATIONS

Chinese First Office Action dated Oct. 10, 2022 for Chinese Application No. 201980052974.5.
(Continued)

*Primary Examiner* — Ljiljana V. Ciric
(74) *Attorney, Agent, or Firm* — EIP US LLP

(57) ABSTRACT

A method for authenticating remote access to a reefer control system, the method including establishing a connection between a communication device and a container controller, requesting access to container data via the container controller, providing authorization information to the container controller, determining based on verification of the provided authorization information in a database an access level for accessing container data by the communication device. The container controller is further configured to self-diagnose any error and include the diagnosis in an error report to the communication device. Also disclosed is a communication device for securely accessing a reefer control system that carries out such a method, and a computer program product configured to cause execution of such a (Continued)

method. Further disclosed is a reefer control system for providing secure remote access to such a container controller.

22 Claims, 10 Drawing Sheets

(51) Int. Cl.
    *G06Q 10/087*     (2023.01)
    *H04L 9/40*     (2022.01)
    *H04L 67/12*     (2022.01)
    *H04W 12/06*     (2021.01)
    *H04W 12/08*     (2021.01)

(52) U.S. Cl.
    CPC ............ *H04L 63/08* (2013.01); *H04L 63/101* (2013.01); *H04L 67/12* (2013.01); *H04W 12/06* (2013.01); *H04W 12/08* (2013.01)

(56) References Cited

U.S. PATENT DOCUMENTS

| | | | |
|---|---|---|---|
| 8,959,036 B2* | 2/2015 | Huat | F25D 11/003 705/333 |
| 11,079,173 B2* | 8/2021 | Jonsson | F25D 29/008 |
| 11,493,904 B2* | 11/2022 | Watkins | G05B 19/042 |
| 2005/0088299 A1 | 4/2005 | Bandy et al. | |
| 2006/0008587 A1* | 1/2006 | Suzuki | C23C 22/00 427/377 |
| 2006/0013234 A1 | 1/2006 | Thomas et al. | |
| 2007/0040647 A1 | 2/2007 | Saenz et al. | |
| 2008/0270076 A1* | 10/2008 | Breed | B60R 21/01538 702/185 |
| 2008/0316045 A1* | 12/2008 | Sriharto | G16H 20/13 700/214 |
| 2009/0216497 A1 | 8/2009 | Schwiers et al. | |
| 2009/0237258 A1 | 9/2009 | Heck et al. | |
| 2009/0267743 A1 | 10/2009 | Faroe et al. | |
| 2010/0141430 A1 | 6/2010 | Steer | |
| 2011/0221573 A1* | 9/2011 | Huat | G05D 23/19 340/10.1 |
| 2013/0036068 A1* | 2/2013 | Smith | G06Q 10/083 703/2 |
| 2013/0100609 A1* | 4/2013 | Wang | G05D 23/1931 361/688 |
| 2013/0138251 A1* | 5/2013 | Thogersen | F25D 29/003 702/45 |
| 2014/0157809 A1* | 6/2014 | Crombie | G01S 19/13 324/511 |
| 2014/0180953 A1* | 6/2014 | Westcott | A23L 3/3445 705/332 |
| 2015/0058947 A1* | 2/2015 | John | H04W 12/06 726/7 |
| 2015/0205308 A1* | 7/2015 | Huat | F25D 11/003 700/300 |
| 2017/0108261 A1* | 4/2017 | Broussard | F25D 11/003 |
| 2018/0176206 A1 | 6/2018 | Matthews et al. | |
| 2020/0192337 A1* | 6/2020 | Hoffman | G05B 19/41865 |
| 2021/0262727 A1* | 8/2021 | Heide | H04W 12/08 |
| 2023/0184959 A1* | 6/2023 | Li | G01S 19/11 342/357.68 |
| 2024/0174614 A1* | 5/2024 | Jordan | A61K 31/4418 |

FOREIGN PATENT DOCUMENTS

| | | | | |
|---|---|---|---|---|
| CN | 1592191 A | 3/2005 | | |
| CN | 102918552 A | 2/2013 | | |
| CN | 104216907 A | 12/2014 | | |
| CN | 105493538 A | 4/2016 | | |
| CN | 107133755 A | 9/2017 | | |
| EP | 1650926 A2 | 4/2006 | | |
| KR | 20060090884 A | 8/2006 | | |
| KR | 102201667 B1 * | 1/2021 | | |
| WO | WO-2006136108 A1 * | 12/2006 | ............ | B65G 1/065 |
| WO | 2016133609 A1 | 8/2016 | | |
| WO | WO-2020016059 A1 * | 1/2020 | ............ | F25D 11/003 |

OTHER PUBLICATIONS

Danish Search report dated Feb. 14, 2019 for Danish Application No. PA 2018 70492.
International Preliminary Report on Patentability dated Jan. 19, 2021 for International PCT Application No. PCT/EP2019/068414.
International Search Report and Written Opinion dated Sep. 19, 2019 for International PCT Application No. PCT/EP2019/068414.

* cited by examiner

SECURE REMOTE ACCESS TO A REEFER CONTROL SYSTEM

CROSS-REFERENCE TO RELATED APPLICATIONS

This application is a 371 of International Application No. PCT/EP2019/068414, filed Jul. 9, 2019, which claims priority to Danish Application No. PA201870492, filed Jul. 19, 2018 under 35 U.S.C. § 119 (a). Each of the above-referenced patent applications is incorporated by reference in its entirety.

TECHNICAL FIELD

The invention relates generally to the field of reefer control systems. More particularly, it relates to a method for authenticating remote access to a reefer control system.

BACKGROUND

A reefer container is an enclosed unit used for transporting temperature sensitive cargo. The container requires an external power supply for its operation. The reefer container comprises a display and a control interface for monitoring, accessing and editing settings e.g. temperature settings.

Due to the easily accessible display and control interface of the reefer container users may, accidentally or not, tamper with the settings of the reefer container.

Therefore, there is a need for preventing unauthorized access to or tampering with the control system of the reefer container. More specifically, there is a need for preventing unauthorized users from tampering with the display and the control interface of the reefer container.

SUMMARY

It is an object of some embodiments to solve or mitigate, alleviate, or eliminate at least some of the above or other disadvantages.

According to a first aspect, this is achieved by a method for authenticating remote access to a reefer control system.

The method comprises establishing a connection between a communication device and a container controller, requesting access to container data via the container controller, providing authorization information to the container controller, and determining based on verification of the provided authorization information in a database an access level for accessing container data by the communication device.

The method further comprises the container controller being further configured to self-diagnose any error and including the diagnose in an error report to the communication device.

In some embodiments, the method further comprises confirming the determined access level to the communication device.

In some embodiments, the container data comprises one or more of status information, error information, error handling and settings of the container.

In some embodiments, the authorization information comprises a handshake mechanism or a token and/or username and/or password.

In some embodiments, the database is stored locally and/or remotely.

In some embodiments, the access levels comprise a level of no access, a level of read only access, a level of write/edit access and a level of configuration access.

In some embodiments, the communication device may be a wireless communication device or a communication device configured for cable connection to the container controller.

According to a second aspect, this is achieved by a communication device for securely accessing a reefer control system.

The communication device comprises a memory comprising executable instructions and one or more processors configured to communicate with the memory, wherein the one or more processors are configured to execute the instructions to cause the communication device to carry out the method according to the first aspect.

In some embodiments, the communication device is configured to be used for maintenance part ordering and/or warranty report creation and/or settings configuration.

In some embodiments, the communication device is further configured to generate an order form and/or a warranty report based on the accessed container data.

In some embodiments, the communication device is further configured to perform a settings configuration/reconfiguration in the reefer control system based on the accessed container data.

In some embodiments, the communication device may be a wireless communication device or a communication device configured for cable connection to the reefer control system.

According to a third aspect, this is achieved by a reefer control system for providing secure remote access to a container controller.

The system comprises a connection module configured to establish a connection between a communication device and the container controller, an access module configured to receive access requests to container data, a communication module configured to receive authorization information, and a determining module configured to determine based on verification of the received authorization information in a database an access level for accessing container data based on the authorization information.

In some embodiments, the system further comprises a confirmation module configured to confirm the determined access level to the communication device.

In some embodiments, the container data comprises one or more of status information, error information, error handling and settings of the container.

In some embodiments, the authorization information comprises a handshake mechanism or a token and/or username and/or password.

In some embodiments, the database is stored locally and/or remotely.

In some embodiments, the access levels comprise a level of no access, a level of read only access, a level of write/edit access and a level of configuration access.

In some embodiments, the system further comprises an error indicator and wherein the container controller is configured to send an error report to the communication device in case the error indicator indicates error.

In some embodiments, the container controller is further configured to self-diagnose any error and include the diagnose in the error report to the communication device.

According to a fourth aspect, this is achieved by a container comprising the reefer control system according to the third aspect.

In some embodiments, the container according to the fourth aspect is configured to be remotely accessed for maintenance part ordering and/or warranty report creation and/or settings configuration.

According to a fifth aspect, this is achieved by a computer program product comprising a non-transitory computer readable medium, having thereon a computer program comprising program instructions. The computer program being loadable into a data processing unit and configured to cause execution of the method according to the first aspect when the computer program is run by the data processing unit.

An advantage of the embodiments is preventing unauthorized users from tampering with the display and the control interface of the reefer container.

Another advantage of the embodiments is that user access to container data can be dynamically set by means of different access levels e.g. if a user (i.e. a service technician) leaves the company then this user will no longer be able to access the reefer control system with a change of his/hers access level to "no access" or if a service technician needs full configuration access in order to set the correct settings the access level is changed to "configuration access".

A further advantage of the embodiments is that a communication device or a remote database e.g. a backend service database automatically can generate a service order which it can further send to a repair station. The automatic generation and sending of the service order provides an efficient service process wherein time and effort are optimized. Furthermore, based on the received service order at the repair station, the repair station can secure that they have the inventory in stock before the container arrives at the repair station which reduces any waiting time in the repair station.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Embodiments of the present disclosure will be described and exemplified more fully hereinafter with reference to the accompanying drawings. The solutions disclosed herein can, however, be realized in many different forms and should not be construed as being limited to the embodiments set forth herein.

As mentioned above, there is a need for preventing unauthorized users from tampering with the display and the control interface of the reefer container.

By enabling wired or wireless connectivity between a communication device and a reefer controller of a container i.e. a container controller, the physical display unit and the control interface on the container can be removed and the functionality of the physical display unit and the control interface can be performed by a communication device instead. Therefore, it is of outmost importance that the access to the container data is verified by the container controller such that tampering is prevented via the communication device as well.

Since the physical display unit and the control interface is removed, the container may have a limited indication of the status of the container instead e.g. a green LED for OK status and one red LED for ERROR status.

In the following, embodiments will be described where a container controller is connected to remote databases in a backend system or a remote database in a repair station. It is possible in other embodiment that the functionality of the reefer control system described below is limited locally, i.e. only connected to a local database of the reefer control system and wherein the container is not connected to a wider network over a cellular network. In this case, the container will locally store (e.g. in a local database of the reefer control system) the required information (e.g. error codes and/or user IDs with corresponding access levels) and communicate with the communication device locally over connectivity such as NFC, WiFi, BLUETOOTH® (e.g., a wireless communication protocol) connectivity, etc., without interrogating with a backend system and/or backend/remote databases.

Figure 1:
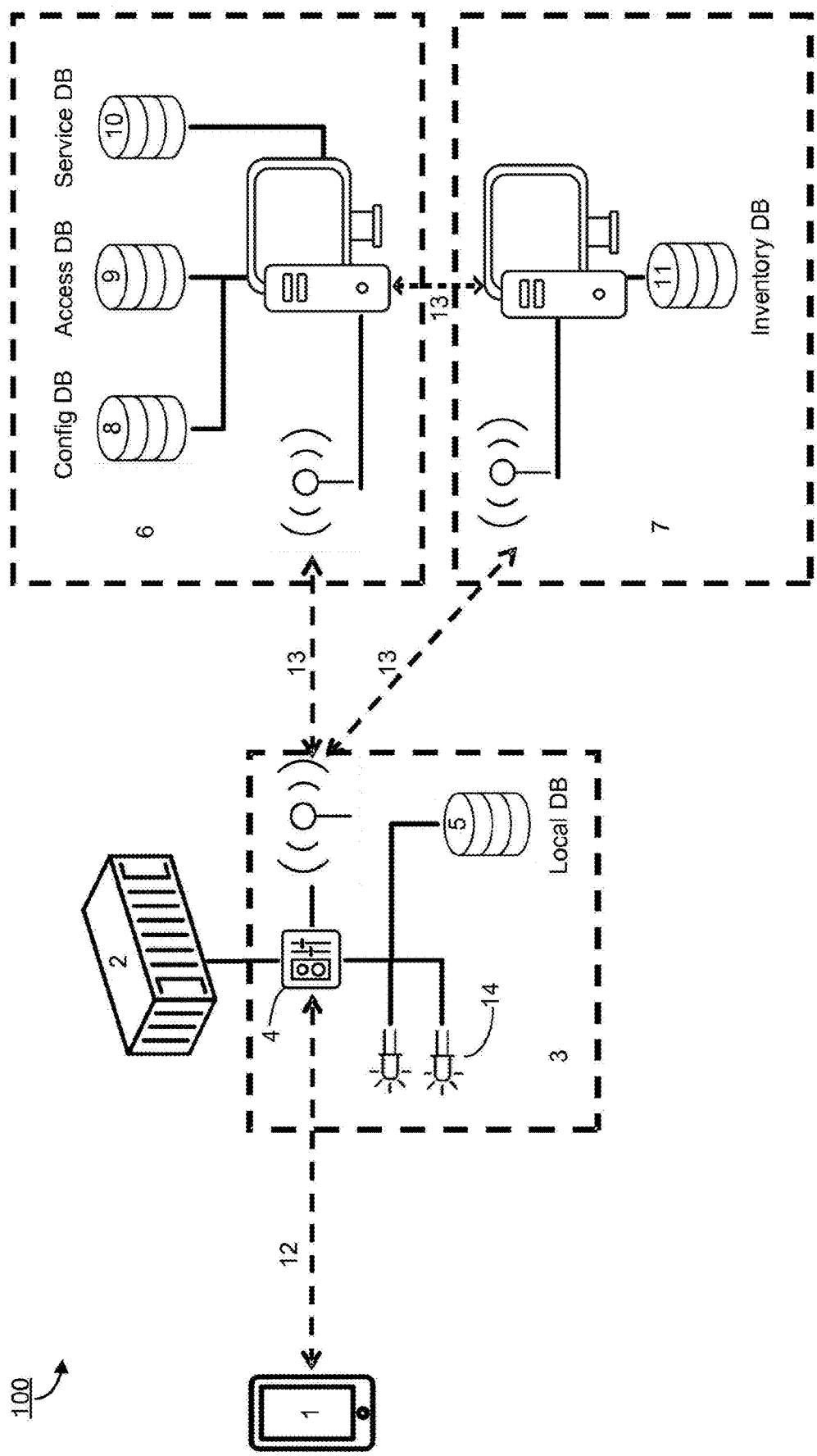
FIG. 1 is a schematic overview illustrating some embodiments.

FIG. 1 is a schematic general overview illustrating some embodiments. More specifically, FIG. 1 illustrates a container (2) without a physical display unit and control interface comprising a reefer control system (3). The reefer control system (3) further comprises a container controller (4), error indicators (14) e.g. LED OK/ERROR indicators, a local database (5) for storing e.g. error data and/or user IDs with corresponding access levels, a communication module configured for communication over a cellular network (13) with a backend system (6) and/or a repair station (7) each comprising communication modules for communicating over the cellular network (13) with each other. The backend system (6) and the repair station (7) further comprise remote databases e.g. configuration database (8), access database (9), service database (10) and warranty claim database (15) in the backend system (6) and inventory database (16) in the repair station (7).

FIG. 1 further illustrates a communication device (1) with an established connection (12) with the container controller (4) wherein the established connection (12) utilizes connectivity such as NFC, WiFi, BLUETOOTH® (e.g., a wireless communication protocol) connectivity, etc. The backend system (6) and repair station (7) further comprise databases with container (2) specific data e.g. status information, error information, error handling and settings of the container. The backend system (6) comprises e.g. a configuration database (8) with e.g. settings of the container (2), an access database (9) with e.g. access level for each unique user (i.e. for each user ID a corresponding access level), a service database (10) with e.g. service log information of the container (2). The repair station (7) comprises e.g. an inventory database (11) with e.g. data on inventory on stock.

Figure 2:
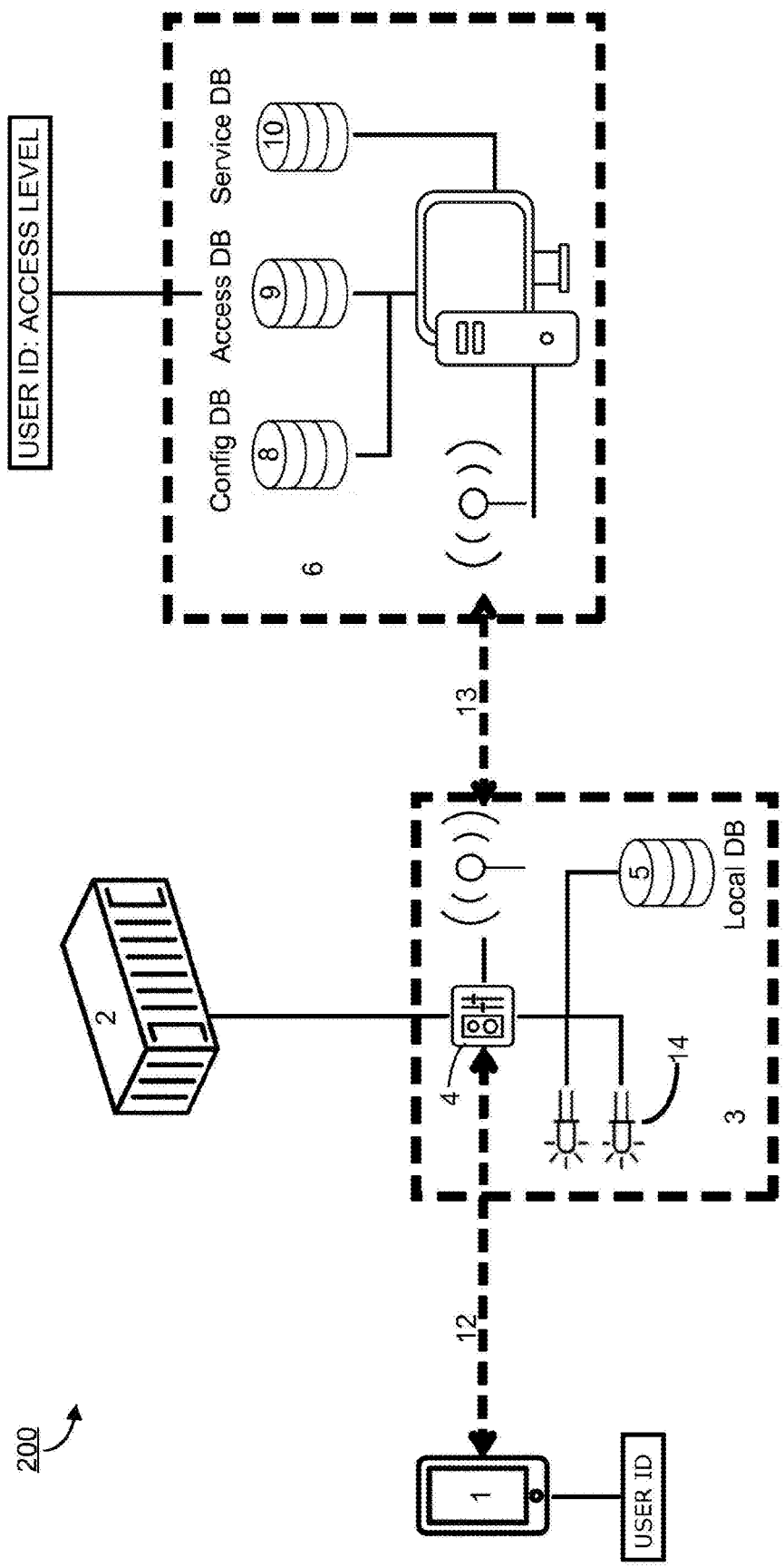
FIG. 2 is a schematic overview illustrating some embodiments.

FIG. 2 is a schematic overview illustrating some embodiments relating to access control. More specifically, FIG. 2 illustrates a communication device (1) comprising a unique user ID, i.e. representing a unique user, with an established connection over connectivity such as NFC, WiFi, BLUETOOTH® (e.g., a wireless communication protocol) connectivity, etc. with a container controller (4). The container controller (4) is e.g. responsible for granting user access to configuration menus depending on assigned access level of the user ID by authentication means such as a handshake mechanism or a token and/or username and/or password or a physical access token arrangement. The container controller (4) verifies the access level for each user ID in a remote access database (9) in a backend system (6) or in a local database (5) of the reefer control system (3) and wherein the access levels comprise both basic and advanced levels. The basic access levels comprise no access or access to current status and some error codes while the advanced levels comprise all error codes, access to configuration menus, settings menus or maintenance menu. Examples of specific access levels comprise a level of no access, a level of read only access, a level of write/edit access and a level of configuration access.

Figure 3:
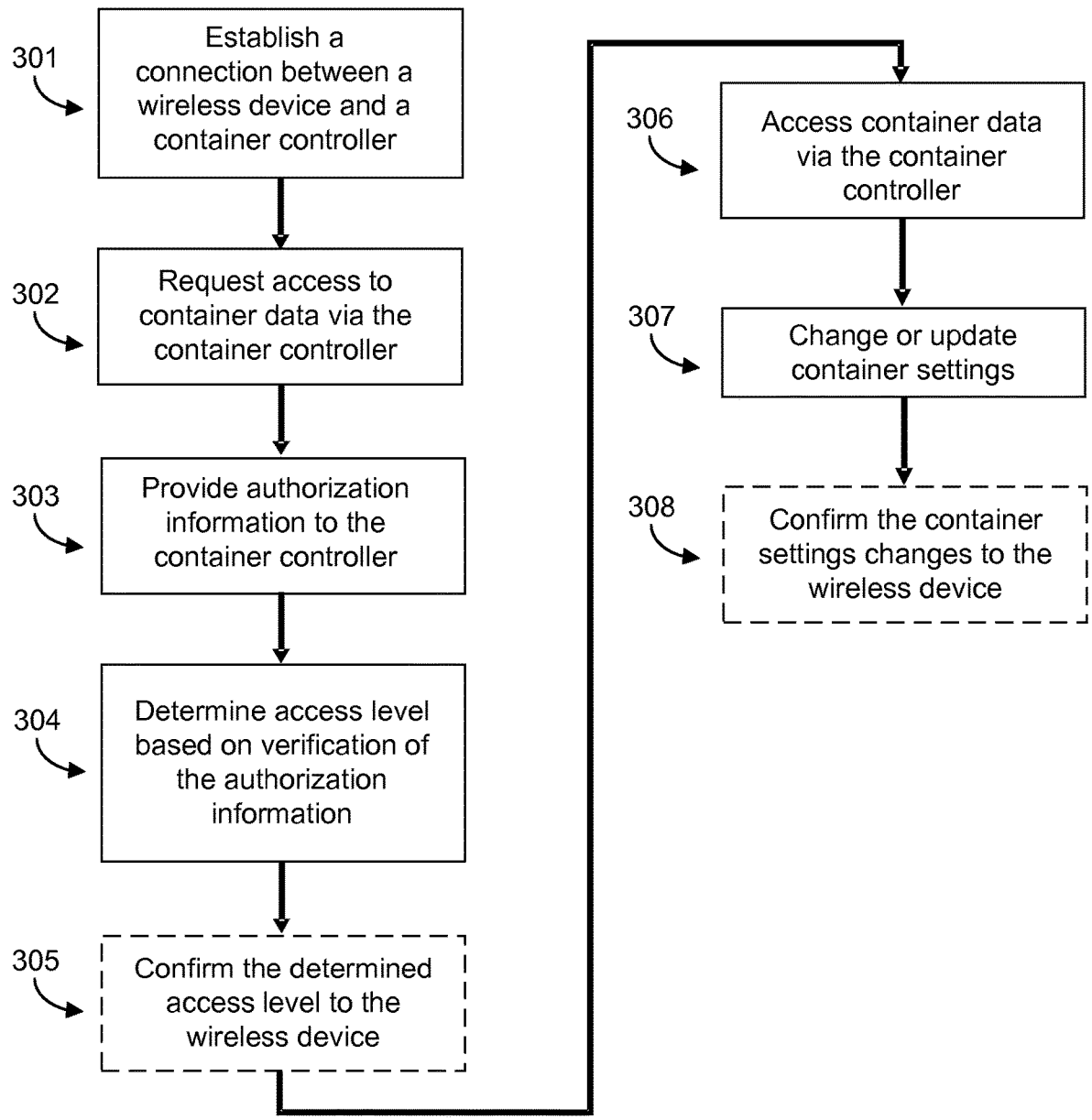
FIG. 3 is a flowchart illustrating example method steps according to some embodiments.

FIG. 3 is a flowchart illustrating example method steps according to some embodiments relating to access control. In step 301, a connection is established between a communication device (1) and a container controller (4). Over the established connection, in step 302, access to container data is requested via the container controller (4). Following the access request to container data, in step 303, authorization information is provided to the container controller (4), whereby, in step 304, an access level is determined based on verification of the provided authorization information. In optional step 305, a confirmation of the determined access level is sent to the communication device (1). The communication device (1), in step 306, accesses container data via the container controller (4) according to the determined access level and, in step 307, changes or updates the container settings (provided that the determined access level allows changes or updates to the container settings). In optional step 308, a confirmation of the changes or updated settings is sent to the communication device (1).

Figure 4:
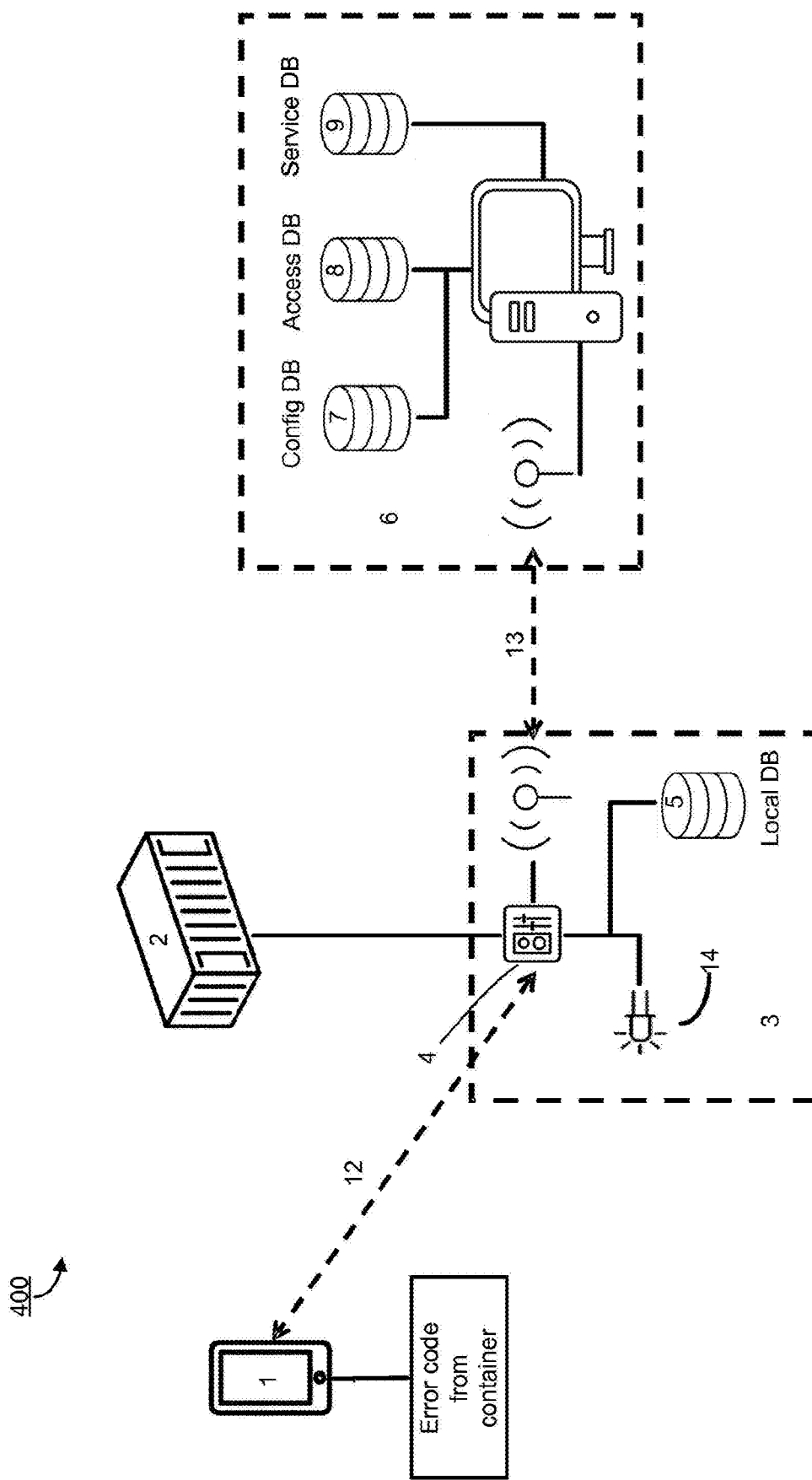
FIG. 4 is a schematic overview illustrating some embodiments.

FIG. 4 is a schematic overview illustrating some embodiments relating to error management. More specifically, FIG. 4 illustrates a communication device (1) comprising an error code from the container (2) i.e. an error message in the form of an alarm or a notification. The error message has been communicated to the communication device (1) via the container controller (4) over connectivity such as NFC, WiFi, a wireless communication protocol (e.g., Bluetooth®), etc. (12) connectivity and wherein the error indicators (14) of the reefer control system (3) indicate error. The container controller (4) has the ability to self-diagnose error codes from the container (2) by utilizing information (i.e. looking up repair instructions based on the error code) from the service database (10) of the backend system (6) and/or a ETI system over the cellular network (13) and the diagnosis of the error code may be comprised in the error message. In case the container controller has not self-diagnosed the error code or not sent the diagnosis to the communication device (1), the communication device (1) is also able to self-diagnose the error code by utilizing a service guide (e.g. repair guidance by means of text, video and manual) stored in the communication device (1) or in the local database (5) of the reefer control system (3) or in the service database (10) of the backend system (6) or by guidance of an online engineer providing real time guidance from the backend system (6) over the cellular network (13). By means of this error management, the user is provided with information for conducting routine or emergency maintenance or service guidance in the field e.g. in a port or on a ship or at a remote premise.

Figure 5:
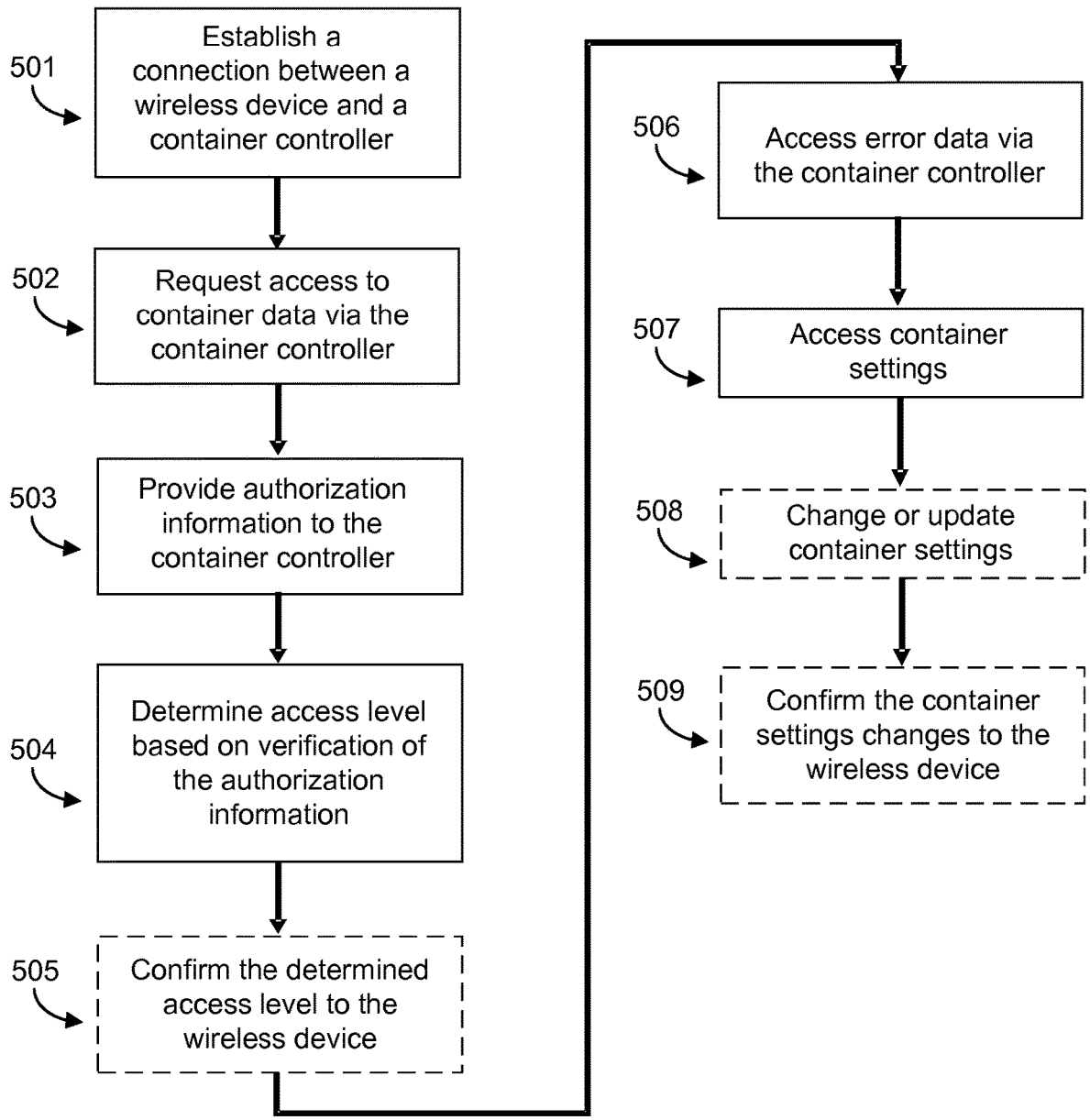
FIG. 5 is a flowchart illustrating example method steps according to some embodiments.

FIG. 5 is a flowchart illustrating example method steps according to some embodiments relating to error management. Preceding the following method steps, according to FIG. 4, an error message has been communicated to the communication device (1) via the container controller (4) over connectivity such as NFC, WiFi, a wireless communication protocol (e.g., Bluetooth®), etc. connectivity (12) and error indicators (14) of the reefer control system (3) indicate error. In step 501, a connection is established between a communication device (1) and a container controller (4). Over the established connection, in step 502, access to container data is requested via the container controller (4). Following the access request to container data, in step 503, authorization information is provided to the container controller (4), whereby, in step 504, an access level is determined based on verification of the provided authorization information. In optional step 505, a confirmation of the determined access level is sent to the communication device (1). The communication device, in step 506, accesses error data, corresponding to the error data of the received error message, via the container controller (4) according to the determined access level and, in step 507, accesses the container settings (provided that the determined access level allows access to the container settings). In optional step 508, changes or updates the container settings (provided that the determined access level allows changes or updates to the container settings). In optional step 509, a confirmation of the changes or updated settings is sent to the communication device (1).

Figure 6:
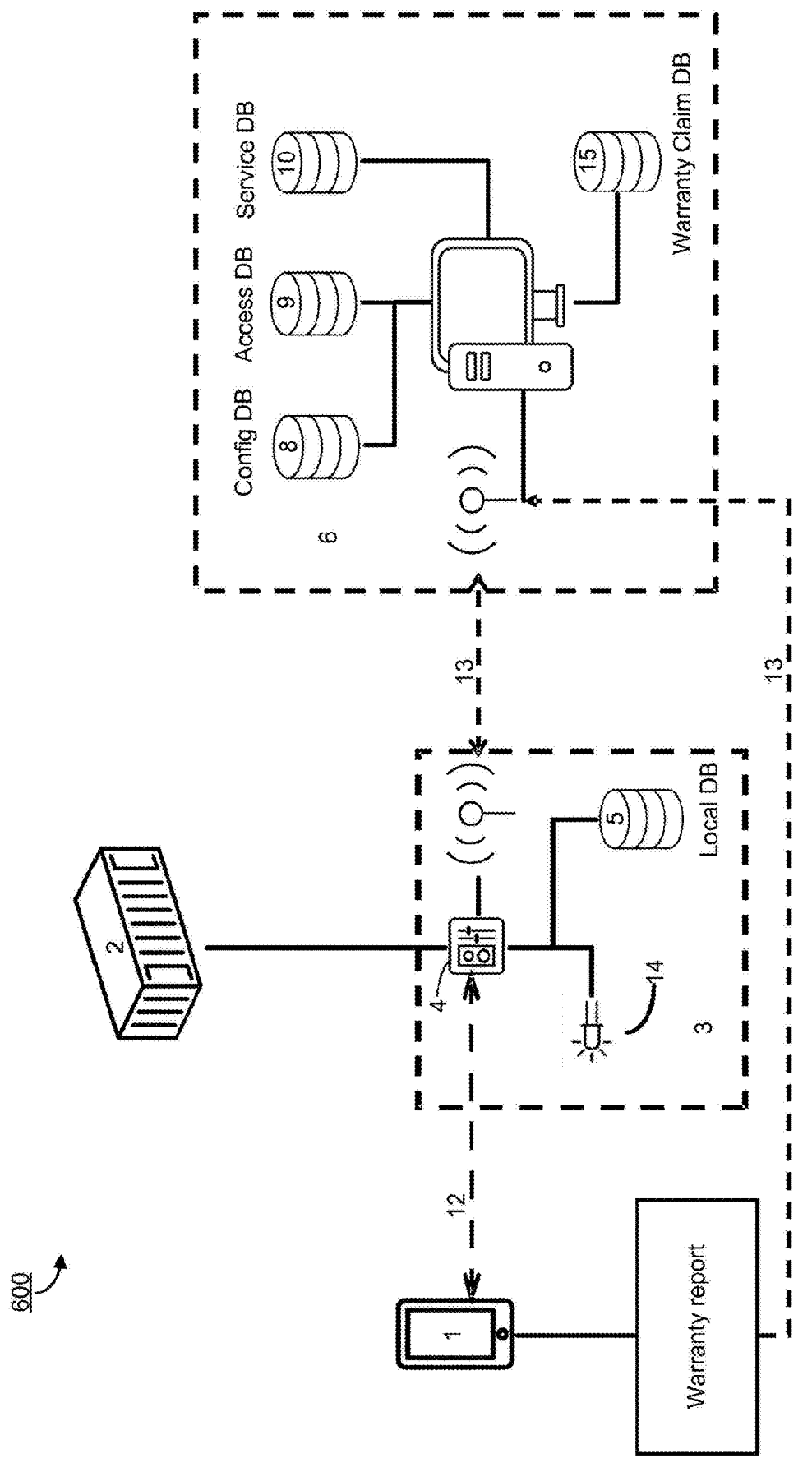
FIG. 6 is a schematic overview illustrating some embodiments.

FIG. 6 is a schematic overview illustrating some embodiments relating to warranty report generation. More specifically, FIG. 6 illustrates a communication device (1) comprising an error code from the container (2) i.e. an error message in the form of an alarm or a notification. The error message has been communicated to the communication device (1) via the container controller (4) over connectivity such as NFC, WiFi, a wireless communication protocol (e.g., Bluetooth®), etc. connectivity (12) and wherein the error indicators (14) of the reefer control system (3) indicate error. In addition to sending the error message to the communication device (1) over connectivity such as NFC, WiFi, a wireless communication protocol (e.g., Bluetooth®), etc. connectivity (12), the container controller (4) stores the error message in the local database and sends the same error message to the service database (10) in the backend system (6) for a complete and correct log information over the cellular network (13). The container controller (4) has the ability to self-diagnose error codes from the container (2) by utilizing information (i.e. looking up repair instructions based on the error code) from the service database (10) of the backend system (6) over the cellular network (13) and the diagnosis of the error code may be comprised in the error message. In addition to the received error message comprising the error codes, the log information is downloaded to the communication device (1) via the container controller (4) from the local database (5) and/or the service database (10). Following the error message and the log information, the communication devices (1) receives guidance and instructions for capturing information of faulty components e.g. directions (i.e. display of images and illustrations on how to take photos by means of the communication device (1) or directions on how to physically access the components) on photo obtaining of key components based on the error codes from the error message for generating a warranty report from either local storage of the guidance in the communication device (1) or the local database (5) in the reefer control system (3) or in the service database (10) in the backend system (6). The generated warranty report is sent over a cellular network (13) to the backend system (6) to be stored and processed in a warranty claim database (15).

Figure 7:
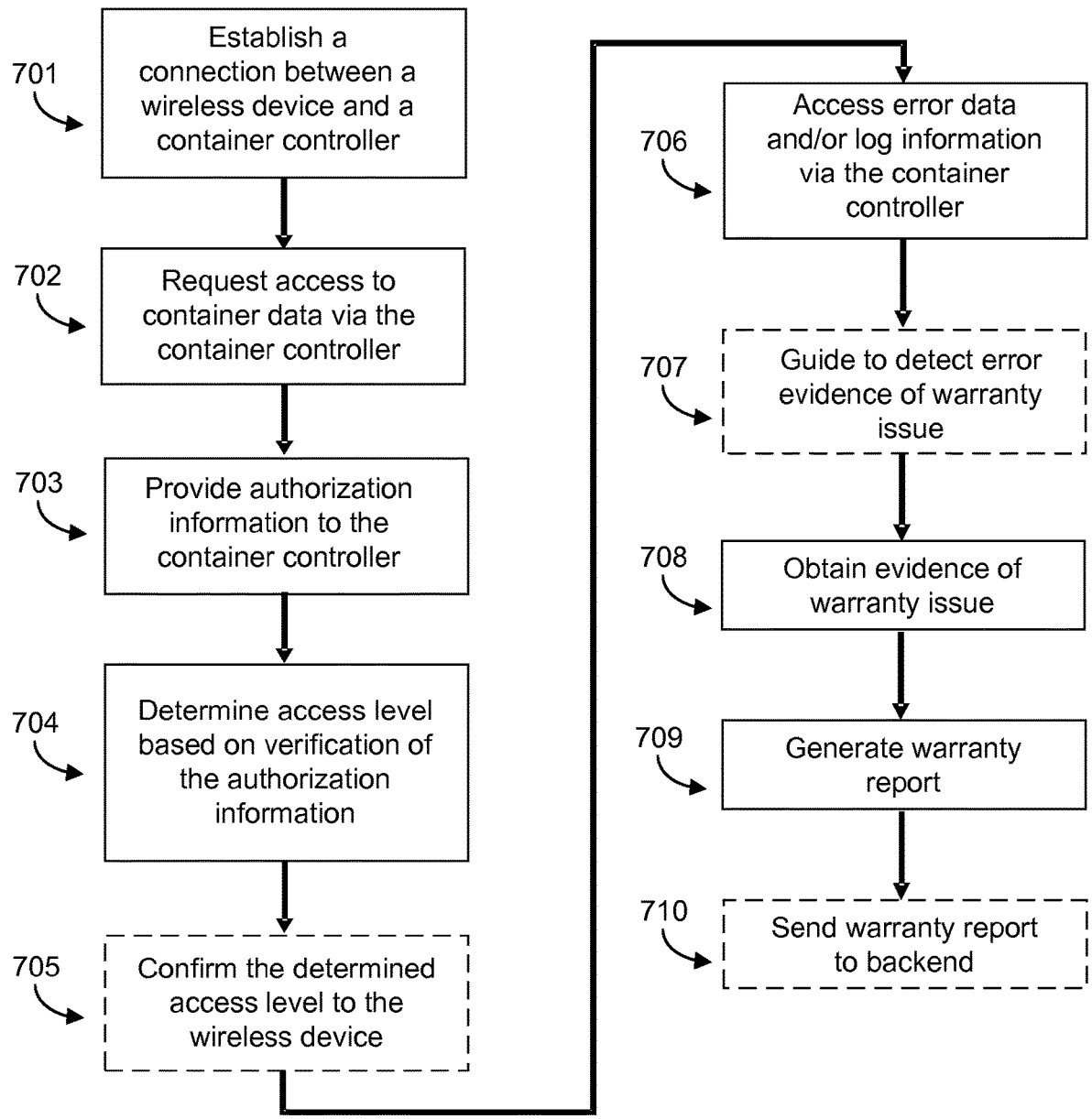
FIG. 7 is a flowchart illustrating example method steps according to some embodiments.

FIG. 7 is a flowchart illustrating example method steps according to some embodiments relating to warranty report generation. Preceding the following method steps, according to FIG. 4, an error message has been communicated to the communication device (1) via the container controller (4) over connectivity such as NFC, WiFi, a wireless communication protocol (e.g., Bluetooth®), etc. connectivity (12) and error indicators (14) of the reefer control system (3) indicate error. In step 701, a connection is established between a communication device (1) and a container controller (4). Over the established connection, in step 702, access to container data is requested via the container controller (4). Following the access request to container data, in step 703, authorization information is provided to the container controller (4), whereby, in step 704, an access level is determined based on verification of the provided authorization information. In optional step 705, a confirmation of the determined access level is sent to the communication device (1). The communication device, in step 706, accesses error data, corresponding to the error data of the received error message, via the container controller (4) according to the determined access level. In optional step 707, the communication device (1) receives guidance and instructions for capturing information of faulty components e.g. photos of components based on the error codes from the error message for generating a warranty report. In step 708, evidence of the warranty issue is obtained whereby, in step 709, a warranty report is generated. In optional step 710, the generated warranty report is sent over a cellular network (13) to the backend system (6) to be stored and processed in a warranty claim database (15).

Figure 8:
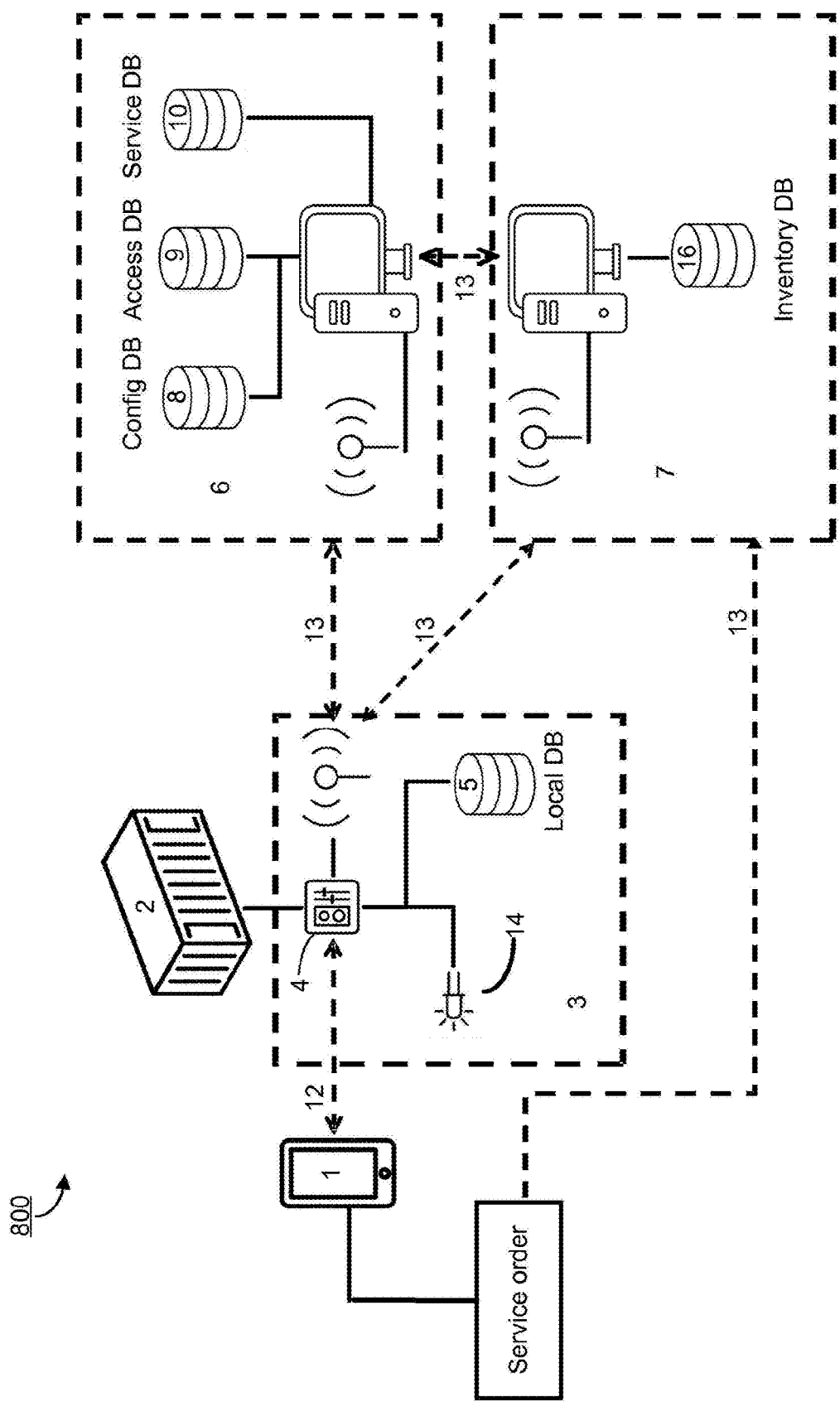
FIG. 8 is a schematic overview illustrating some embodiments.

FIG. 8 is a schematic overview illustrating some embodiments relating to service order generation. More specifically, FIG. 8 illustrates a communication device (1) comprising an error code from the container (2) i.e. an error message in the form of an alarm or a notification. The error message has been communicated to the communication device (1) via the container controller (4) over connectivity such as NFC, WiFi, a wireless communication protocol (e.g., Bluetooth®), etc. connectivity (12) and wherein the error indicators (14) of the reefer control system (3) indicate error. In addition to sending the error message to the communication device (1) over connectivity such as NFC, WiFi, a wireless communication protocol (e.g., Bluetooth®), etc. connectivity, the container controller (4) has stored the error message in the local database and has sent the same error message to the service database (10) in the backend system (6) over a cellular network (13) for a complete and correct log information. The container controller (4) has the ability to self-diagnose error codes from the container (2) by utilizing information (i.e. looking up repair instructions based on the error code) from the service database (10) of the backend system (6) over the cellular network (13) and the diagnosis of the error code may be comprised in the error message provided to the communication device (1). In addition to the received error message comprising the error codes, information regarding new part(s) may be received by the communication device (1) via the container controller (4) from the service database (10) which has identified the parts to be replaced or repaired based on the error message or information relating to when the container (2) last received a service and what parts were replaced then. Following the error message and optionally the new part(s) information, the communication devices (1) generates a service order for the repair station (7) which is sent over a cellular network (13) to the repair station (7) to be processed and verified against an inventory database (16) to ensure that the required new part(s) are in stock. The new part(s) may comprise a complete new or part of a component or a certain amount of refrigerant. As an alternative, the backend system (6) may generate the service order itself and send it directly to the repair station (7) over the cellular network (13) alleviating the communication device (1) from this task.

Figure 9:
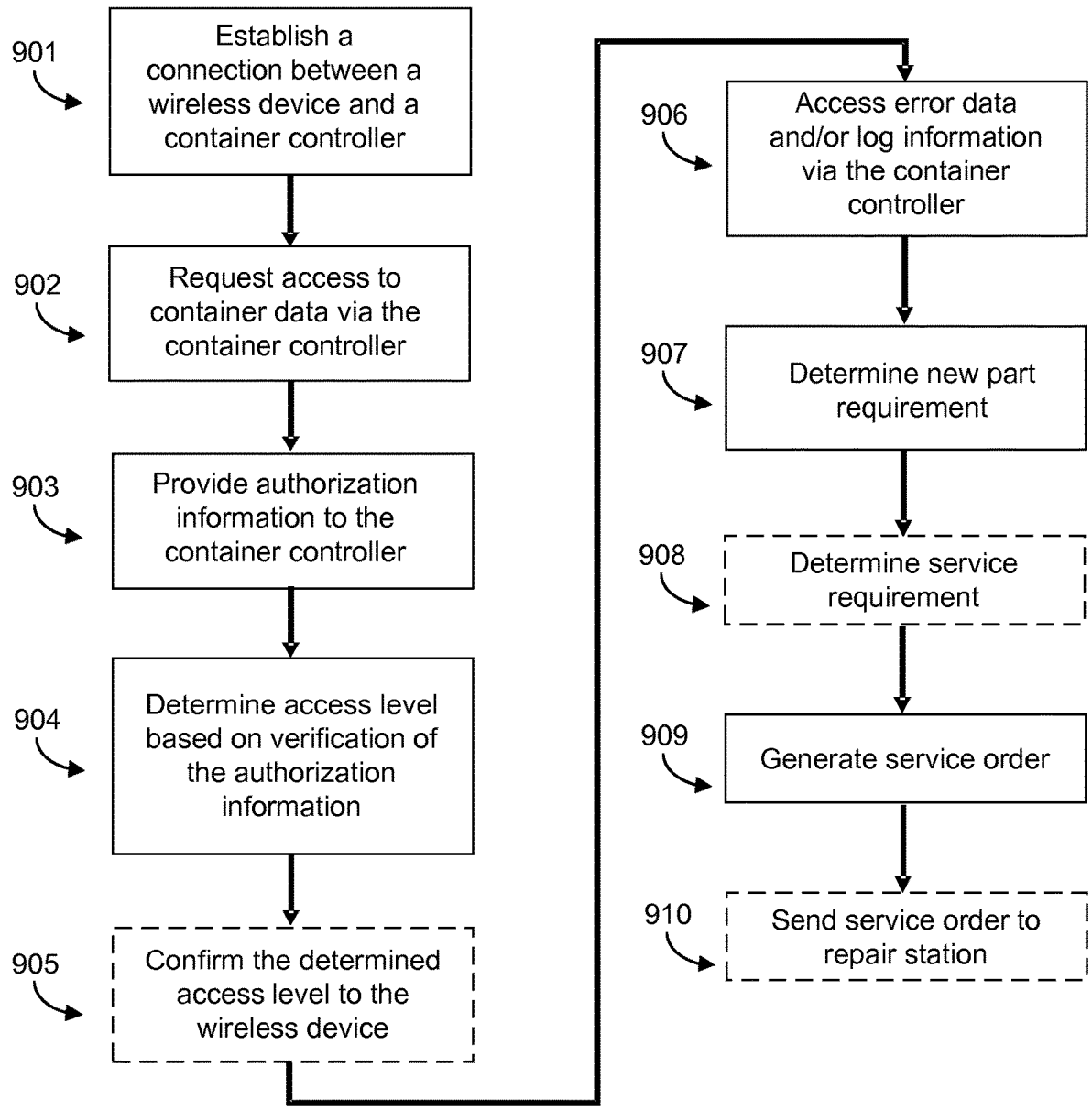
FIG. 9 is a flowchart illustrating example method steps according to some embodiments.

FIG. 9 is a flowchart illustrating example method steps according to some embodiments relating to predictive maintenance. Preceding the following method steps, according to FIG. 4, an error message has been communicated to the communication device (1) in the form of an alarm or a notification via the container controller (4) over connectivity such as NFC, WiFi, a wireless communication protocol (e.g., Bluetooth®), etc. connectivity (12) and error indicators (14) of the reefer control system (3) indicate error. In step 901, a connection is established between a communication device (1) and a container controller (4). Over the established connection, in step 902, access to container data is requested via the container controller (4). Following the access request to container data, in step 903, authorization information is provided to the container controller (4), whereby, in step 904, an access level is determined based on verification of the provided authorization information. In optional step 905, a confirmation of the determined access level is sent to the communication device (1). The communication device, in step 906, accesses error data, corresponding to the error data of the received error message, and/or log information via the container controller (4) according to the determined access level and, in step 907, determines parts to be replaced or repaired based on the error data and/or log information (information relating to when the container (2) last received a service and what parts were replaced then). In optional step 908, a service requirement is determined. In step 909, a service order is generated based on the information from the previous method steps 906, 907 and optionally 908, either by the communication device (1) or by the backend system (6). In optional step 910, the generated service order is sent to the repair station (7).

Figure 10:
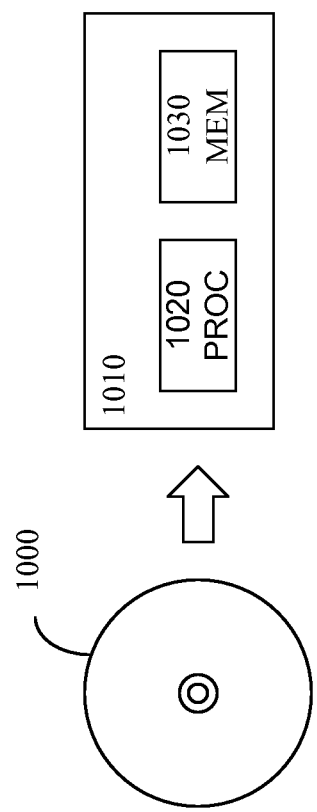
FIG. 10 is a schematic drawing illustrating an example computer readable medium according to some embodiments.

FIG. 10 is a schematic drawing illustrating an example computer readable medium according to some embodiments. More specifically, FIG. 10 illustrates an example computer readable medium in the form of a compact disc (CD) ROM 1000. The computer readable medium has stored there on a computer program comprising program instructions. The computer program is loadable into a data processor (PROC) 1020, which may, for example, be comprised in a communication device 1. When loaded into the data processing unit, the computer program may be stored in a memory (MEM) 1030 associated with or comprised in the data-processing unit.

According to some embodiments, the computer program may, when loaded into and run by the data processing unit, cause execution of method steps according to, for example, any of the methods 1-6 illustrated in FIG. 3, 5, 7, 9 or otherwise described herein.

Figure 11:
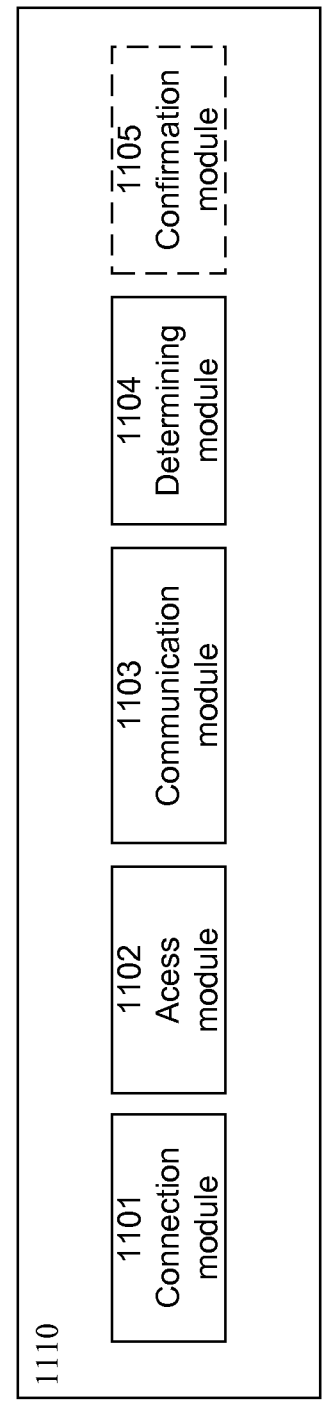
FIG. 11 is a schematic block diagram illustrating an example arrangement according to some embodiments.

FIG. 11 is a schematic block diagram illustrating an example arrangement according to some embodiments. More specifically, FIG. 11 illustrates an example arrangement (1110) of a reefer control system (3) for providing secure remote access to a container controller (4) comprising a connection module (1101) configured to establish a connection between a communication device (1) and the container controller (4), an access module (1102) configured to receive access requests to container data, a communication module (1103) configured to receive authorization information, and a determining module (1104) configured to determine based on verification of the received authorization information in a database an access level for accessing container data based on the authorization information. Optionally, the reefer control system (3) further comprises a confirmation module (1105) configured to confirm the determined access level to the communication device (1).

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware.

Alternatively or additionally, the embodiments may be performed by specialized circuitry, such as application specific integrated circuits (ASIC). The general purpose circuitry and/or the specialized circuitry may, for example, be associated with or comprised in an apparatus such as a communication device.

Embodiments may appear within an electronic apparatus (such as a communication device) comprising arrangements, circuitry, and/or logic according to any of the embodiments described herein. Alternatively or additionally, an electronic apparatus (such as a communication device) may be configured to perform methods according to any of the embodiments described herein.

According to some embodiments, a computer program product comprises a computer readable medium such as, for example a universal serial bus (USB) memory, a plug-in card, an embedded drive or a read only memory (ROM).

Generally, all terms used herein are to be interpreted according to their ordinary meaning in the relevant technical field, unless a different meaning is clearly given and/or is implied from the context in which it is used. Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

What is claimed is:

1. A method for authenticating remote access to a reefer control system comprising the steps of:
   establishing a connection between a communication device and a container controller,
   requesting access to container data via the container controller,
   providing authorization information to the container controller, and
   determining based on verification of the provided authorization information in a database an access level for accessing container data by the communication device,
   wherein the container controller is further configured to self-diagnose any error and include the diagnosis in an error report to the communication device, and, to additionally provide to the communication device at least one set of instructions selected from the group consisting of:
   service instructions;
   repair instructions; and
   instructions for capturing information of faulty components.

2. The method according to claim 1, the method further comprising the step of:
   confirming the determined access level to the communication device.

3. The method according to claim 1, wherein the container data comprises one or more of the following:
   status information, error information, error handling and settings of the container.

4. The method according to claim 1, wherein the authorization information comprises at least one authorization information selected from the group consisting of: information derived from a handshake between the communication device and the container controller; information derived from a physical access token; and a password.

5. The method according to claim 1, wherein the database is stored locally and/or remotely.

6. The method according to claim 1, wherein the access levels comprise a level of no access, a level of read only access, a level of write/edit access and a level of configuration access.

7. A communication device for securely accessing a reefer control system comprising:
a memory comprising executable instructions; and
one or more processors configured to communicate with the memory,
wherein the one or more processors are configured to execute the instructions to cause the communication device to carry out the method according to claim 1.

8. The communication device according to claim 7, wherein the communication device is configured to be used for maintenance part ordering and/or warranty report creation and/or settings configuration.

9. The communication device according to claim 7, wherein the communication device is further configured to generate an order form and/or a warranty report based on the accessed container data.

10. The communication device according to claim 7, wherein the communication device is further configured to perform a settings configuration/reconfiguration in the reefer control system based on the accessed container data.

11. The communication device according to claim 7, wherein the communication device is a wireless communication device.

12. A reefer control system for providing secure remote access to a container controller comprising:
a connection module configured to establish a connection between a communication device and the container controller,
an access module configured to receive access requests to container data,
a communication module configured to receive authorization information, and
a determining module configured to determine based on verification of the received authorization information in a database an access level for accessing container data based on the authorization information,
wherein the container controller is further configured to self-diagnose any error and include the diagnosis in an error report to the communication device, and to additionally provide to the communication device at least one set of instructions selected from the group consisting of:
service instructions;
repair instructions; and
instructions for capturing information of faulty components.

13. The reefer control system according to claim 12, the system further comprising:
a confirmation module configured to confirm the determined access level to the communication device.

14. The reefer control system according to claim 12, wherein the container data comprises one or more of the following:
status information, error information, error handling and settings of the container.

15. The reefer control system according to claim 12, wherein the authorization information comprises at least one authorization information selected from the group consisting of: information derived from a handshake between the communication device and the container controller; information derived from a physical access token; and a password.

16. The reefer control system according to claim 12, wherein the database is stored locally and/or remotely.

17. The reefer control system according to claim 12, wherein the access levels comprise a level of no access, a level of read only access, a level of write/edit access and a level of configuration access.

18. The reefer control system according to claim 12, wherein the system further comprises an error indicator and wherein the container controller is configured to send an error report to the communication device in case the error indicator indicates error.

19. The reefer control system according to claim 12, wherein the communication device is a wireless communication device.

20. A container comprising the reefer control system according to claim 12.

21. The container according to claim 20 configured to be remotely accessed for maintenance part ordering and/or warranty report creation and/or settings configuration.

22. A computer program product comprising a non-transitory computer readable medium, the non-transitory computer readable medium storing a computer program comprising program instructions, the computer program being loadable into a data processing unit and configured to cause execution of the method according to claim 1 when the computer program is run by the data processing unit.

* * * * *